(12) United States Patent
Challis

(10) Patent No.: US 9,638,491 B2
(45) Date of Patent: May 2, 2017

(54) GRIP PANEL BUSHINGS FOR FIREARM

(71) Applicant: Brian Lee Challis, Sandy, UT (US)

(72) Inventor: Brian Lee Challis, Sandy, UT (US)

( * ) Notice: Subject to any disclaimer, the term of this patent is extended or adjusted under 35 U.S.C. 154(b) by 0 days.

(21) Appl. No.: 14/836,758

(22) Filed: Aug. 26, 2015

(65) Prior Publication Data

US 2016/0061561 A1    Mar. 3, 2016

Related U.S. Application Data

(60) Provisional application No. 62/041,724, filed on Aug. 26, 2014.

(51) Int. Cl.
| | | |
|---|---|---|
| *F41C 23/10* | (2006.01) | |
| *F41C 23/16* | (2006.01) | |
| *F16B 37/12* | (2006.01) | |
| *F41A 11/00* | (2006.01) | |
| *F16B 5/02* | (2006.01) | |

(52) U.S. Cl.
CPC .......... *F41C 23/16* (2013.01); *F16B 37/125* (2013.01); *F41A 11/00* (2013.01); *F41C 23/10* (2013.01); *F16B 5/02* (2013.01)

(58) Field of Classification Search
CPC .. F41C 23/16; F41C 23/10; F16B 5/02; F16B 33/004; F16B 37/125; F41A 11/00; F41B 5/0258; F41B 5/0275; F41B 5/0283
USPC ................. 42/71.02; 411/178, 397
See application file for complete search history.

(56) References Cited

U.S. PATENT DOCUMENTS

| | | | | | |
|---|---|---|---|---|---|
| 397,261 | A | * | 2/1889 | Westphal | B65D 39/084 16/2.4 |
| 573,990 | A | * | 12/1896 | Mohn | B65D 39/084 16/2.4 |
| 576,611 | A | * | 2/1897 | Post | B65D 39/084 16/2.4 |
| 863,831 | A | * | 8/1907 | Bender | B65D 39/084 16/2.4 |
| 2,340,864 | A | * | 2/1944 | Carpenter | E04B 1/6183 188/341 |
| 3,434,376 | A | * | 3/1969 | Benjamin | B23B 29/0341 408/153 |
| 3,604,096 | A | * | 9/1971 | Shiroma | B25B 27/0028 29/235 |
| 3,697,187 | A | * | 10/1972 | Faber | B23B 29/0341 408/154 |
| 4,275,263 | A | * | 6/1981 | Chino | H05K 7/00 174/138 D |
| 4,549,755 | A | * | 10/1985 | Kot | H02G 3/0658 174/51 |
| 5,267,474 | A | * | 12/1993 | Ten Hoven | G01F 23/00 248/231.9 |

(Continued)

OTHER PUBLICATIONS

NPL: https://en.wikipedia.org/wiki/List_of_screw_drives.*

*Primary Examiner* — John D Cooper

(57) ABSTRACT

A bushing for mounting a grip panel to a firearm is provided. The bushing has a torquing surface distributed about the head of the bushing to provide improved torque and alignment for the bushing as it is assembled and disassembled into the firearm frame. The bushing may include an O-ring on the bushing itself and an additional O-ring fitted on the grip screws. The bushings and tools for replacing the OEM bushings may be provided as part of a kit.

18 Claims, 7 Drawing Sheets

(56) References Cited

U.S. PATENT DOCUMENTS

| | | | | |
|---|---|---|---|---|
| 5,546,980 | A * | 8/1996 | Kosarzecki | F16K 27/02 137/454.5 |
| 6,052,896 | A * | 4/2000 | Howell, III | B25B 27/14 29/402.08 |
| 6,295,753 | B1 * | 10/2001 | Thummel | F41A 33/02 42/116 |
| 6,447,028 | B1 * | 9/2002 | LaMarca | F16L 25/08 285/123.13 |
| 2010/0083554 | A1 * | 4/2010 | Elpedes | F41G 1/14 42/123 |
| 2013/0185895 | A1 * | 7/2013 | Daniel | F41C 27/00 16/2.1 |
| 2015/0078860 | A1 * | 3/2015 | Ellingson | F16B 33/02 411/368 |

* cited by examiner

GRIP PANEL BUSHINGS FOR FIREARM

CROSS REFERENCE TO RELATED APPLICATION

This application claims the benefit of and priority to U.S. Provisional Patent Application No. 62/041,724 filed Aug. 26, 2014, the contents of this application are incorporated herein by reference in its entirety.

TECHNICAL FIELD

The present invention generally relates to fasteners for a firearm grip panel, and more particularly, relates to improved bushings for retaining firearm grip panels.

BACKGROUND

Firearm customization has become a large market in the United States with many accessories available to make the firearm unique for the owner. One of the most highly modified parts of a firearm are the grip panels. Modifying a grip panel can greatly change the appearance of a firearm by replacing the OEM grip with customize grips made of different materials, such as wood, composite materials, or other materials. To make such modifications to the grip panels, however, the owner must remove and replace the OEM grip panels with hand tools generally available at home.

OEM grip panels are attached to the firearm frame with bushings that are very difficult to remove and reattach without damaging the bushing. The bushings are hollow cylinders with a slot cut across the top edge to accommodate a flat-head screwdriver. This results in a relatively thin-walled tube body where the bushing is easily damaged when significant torque is required to remove the bushings. This type of bushing is used, for example and without limitation, on the 1911 pistol.

Despite these deficiencies of the prior bushing design, it has remained essentially unchanged since its introduction in 1911. Gun enthusiasts desiring to customize their grip panels with grips of different thicknesses are required to install different sized bushings. Replacing these prior art bushings can often lead to broken bushings or stripped thread as the customizer attempts to remove the tightly fastened bushing via the a flat-head screw driver. Once the bushing is damaged, the customizer is forced to use pliers or vise-grips to remove grip panel bushings. This can be time consuming and can also lead to damage to the gun frame.

Moreover, these bushings are difficult to tightly secure to the firearm frame. To compensate for this defect manufacturers will apply a thread-locker (such as Loctite) or stake the bushings to the firearm frame making the bushing extremely difficult to remove. Such methods of "permanently" affixing the bushings to the frame produce a secure attachment, but prevent customization by the owner.

Another problem with the current design is that in order to allow the grip panels and slide over the bushing for assembly, there will be gaps between the two components. As a result, virtually all grip panels have some decree of sliding relative to the firearm frame. This results in a loose feeling grip. Additionally, in the prior design the grip screws can become loose after repeated discharge of the firearm causing even greater sliding between the grip panel and the bushing. This relative motion can result in the grip panel striking against the grip bushing. If the grip panels are made of stone, exotic woods, mammoth tooth, and other materials, the impact between the grip panels and the bushings can lead to cracking of the grip panels. Furthermore, when the grip panel is loose, the firearm will not feel rigid when the gun is fired.

Accordingly, what is needed is a grip panel bushing where a large amount of torque can be applied to the bushing in order to both remove and reattach the bushing without damage to the bushing or the firearm frame. The bushing and associated components should also be capable of snugly securing the grip panel to the firearm frame while also providing dampening of the shock between the firearm frame and the grip panels when the gun is fired. It would also be beneficial for an end-user to receive the various tools and bushings to remove one type of grip panel bushing and replace it with a new and improved firearm bushing without requiring the user to provide tools.

SUMMARY

The invention, in one aspect, features an interchangeable grip panel bushing for mounting a grip panel to a firearm frame. The bushing has a body with a proximal end, a distal end, and a hollow central portion. There is an external thread on the distal end of the body that couples to the firearm frame via a thread. The body also has an internal thread located in the hollow central portion of the body. There is an external central flange located between the proximal end and the distal end. The central flange has an alignment surface to align the bushing to the firearm frame. There is a torquing surface distributed about a circumference of the proximal end of the body for applying a force to engage and disengage the external thread.

In variations of the invention, the bushing may include a bushing O-ring groove positioned between the central flange and the proximal end. An O-ring may be located in this groove. The central flange may be shaped to deform the bushing O-ring into a counter-bore of the grip panel when installed. In one embodiment, the central flange is frusto-conically shaped. A grip screw may be provided that mates with the internal threads of the bushing. The grip screw may also have a grip screw O-ring located on the grip screw.

The torquing surface of the bushing may be one of the following shapes: hexagonal, hexalobular, splinal, double square, or polydrive. The torquing surface may be an internal or external surface. Alternatively, the torquing surface may be cylindrically shaped and have a plurality of flats about the circumference of the proximal end of the body. There may also be rounded surfaces located between the torquing flats.

The bushing can be part of a kit that includes a bushing removal tool for removing the OEM bushings. The tool has a cup sized to fit over the head of an existing bushing. The cup has an open back end sized to allow passage of a portion of a screw where the screw can be fastened to the bushing. There is a torquing feature on the side or the back of the cup.

Another variation of the invention provides a serviceable bushing for mounting a grip panel to a firearm frame. The bushing comprises a bushing body with a lower thread portion on the exterior of the body and an internal thread located in a cavity of the body. There is a distributed driving feature on an end of the body opposite the lower thread portion. This drive feature comprises one of an external polygonal shape, an internal hexalobular drive shape, an external hexagonal drive shape, an internal spline drive shape, an internal double square drive shape, or an internal polydrive drive shape. There may also be a shaped flange located between the distributed drive feature and the lower thread portion.

The bushing may have a bushing O-ring groove positioned between the flange and the distributed driving feature. There may be an O-ring located in the bushing O-ring groove. The shaped flange may be frustoconically shaped to deform the bushing O-ring into a counter-bore of the grip panel when installed. The bushing may also receive a grip screw that mates with the internal thread of the bushing. An O-ring may be located on the grip screw.

The various aspects of this invention may be provided in a kit for the interchanging of grip panel bushing types to mount firearm grip panels. The kit may include two or more bushings with torquing surfaces distributed about a circumference of the proximal end of the body. The kit may include a tool selected to mate with these bushings. The kit may further include bushing O-rings. The kit may also have a second torquing tool that has a driver selected to mate with a second or OEM bushing. The kit may include two or more grip screws adapted to mate with the bushings. Grip screw O-rings may also be provided in the kits. The kit may also include a total of four bushings, with a corresponding number of grip screws, grip screw O-rings, and bushing O-rings. The kit may also include one or more grip panels. In another embodiment, the second torquing tool may have a cup sized to fit over a head of the second or OEM bushing. The cup may have an open back end sized to allow passage of a portion of a screw to couple to the bushing. There may also be a torquing attachment on one of a side or a back portion of the cup.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
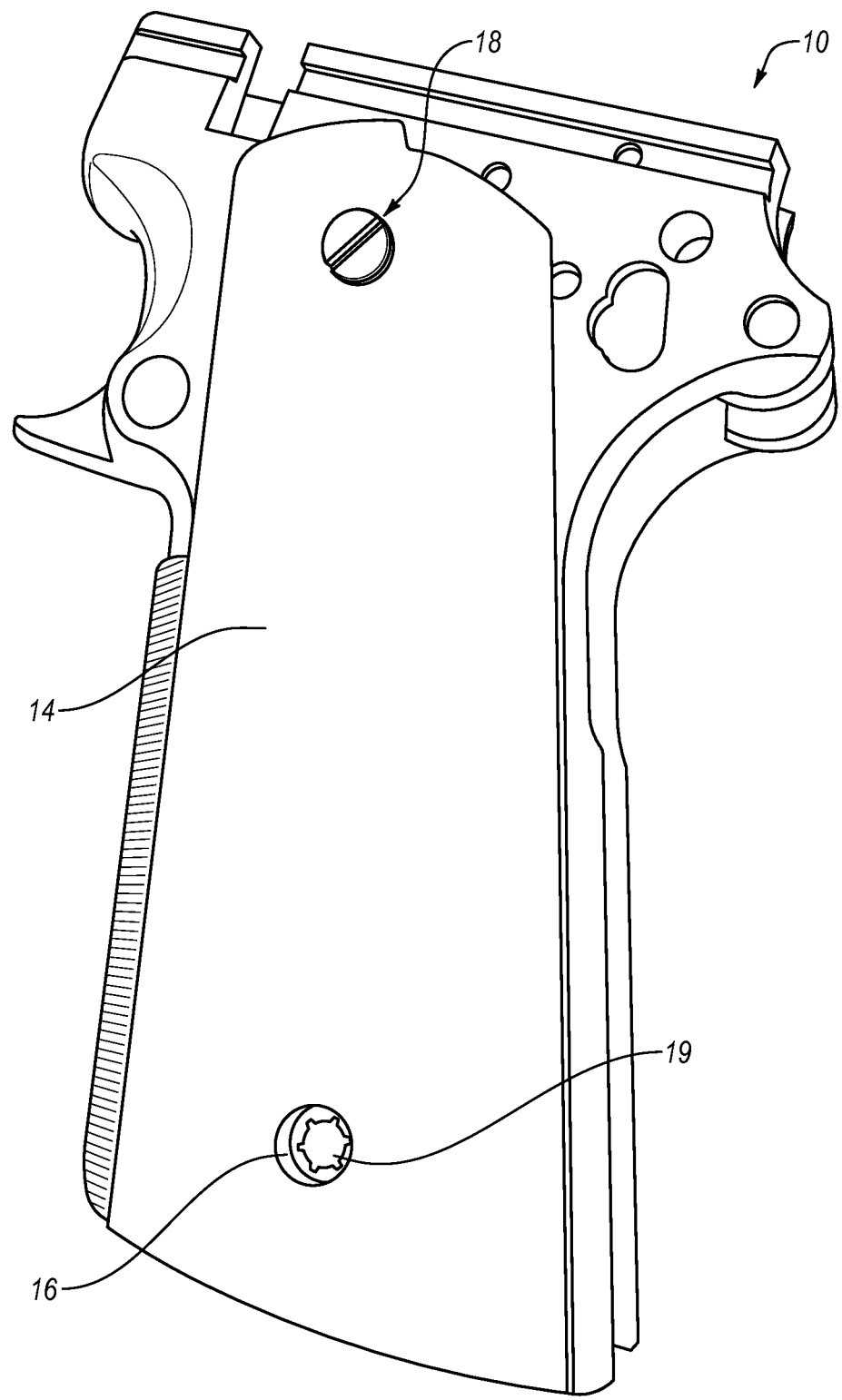
FIG. 1 is an isometric view of a portion of a firearm frame with a grip panel.

FIG. 1 is an isometric view of a portion of a firearm frame 10 of a 1911 pistol. A grip panel 14 is attached to the firearm frame 10 via grip screw 18. The grip screws 18 fasten to the firearm frame 10 via grip panel bushings 19 that are threaded into the firearm frame 10. When a grip panel 14 is installed onto the firearm frame 10, the bushing 19 will slide through a corresponding hole 16 in the grip panel 14. The bushing 19 limits lateral movement of the grip panel 14 relative to the firearm frame 10. Once the grip panel 14 is mounted to the bushing 19, a grip screw 18 will fasten the grip panel 14 to the bushing 19, thus preventing axial separation of the grip panel 14 away from the frame 10. In order to replace the grip panel 14, the grip screws 18 must be removed and the grip panels 14 must be slid off of the bushings.

Figure 2:
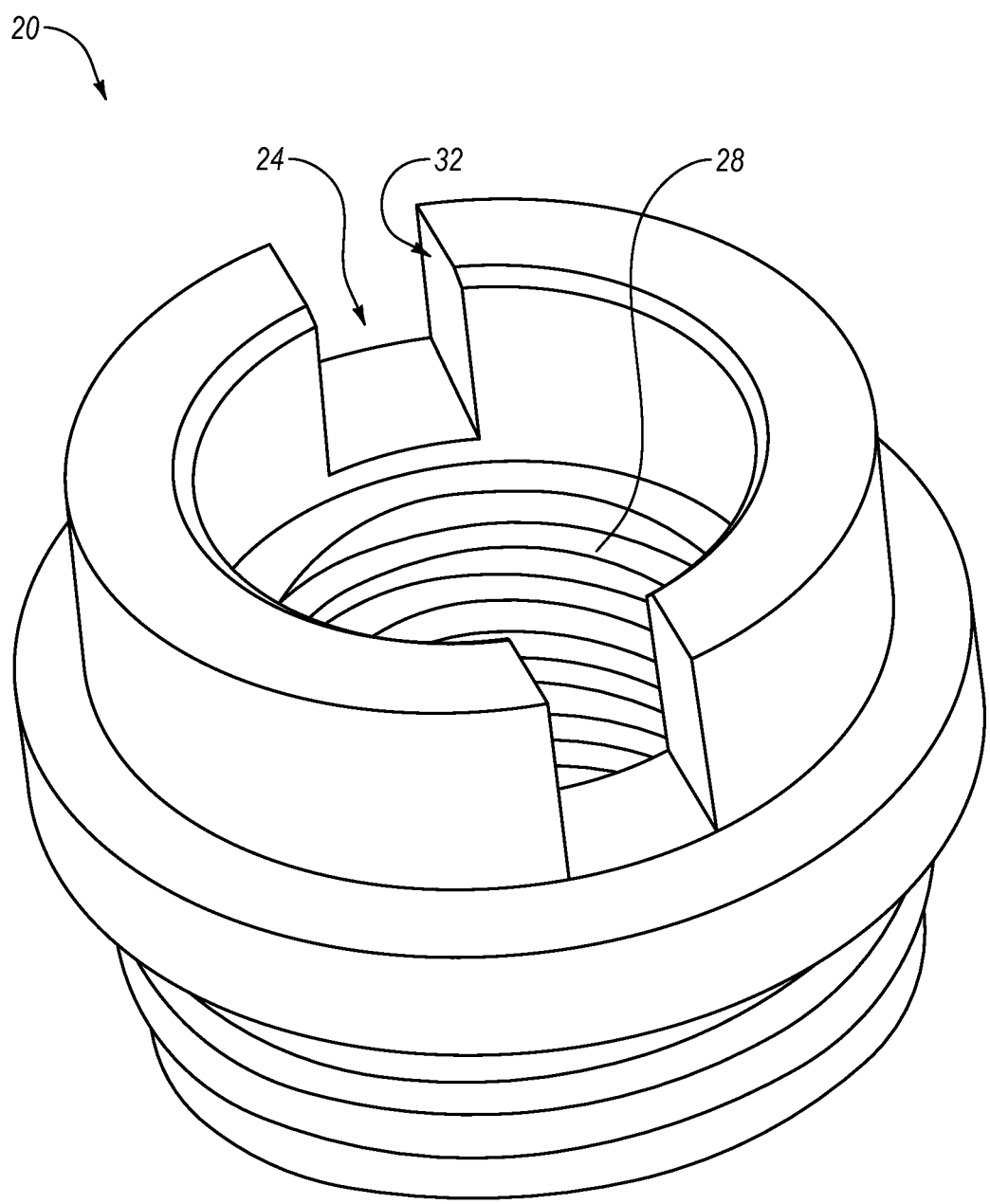
FIG. 2 is an isometric view of a prior art grip screw bushing.

FIG. 2 is an isometric view of the prior art grip panel bushing 20. The grip panel bushing 20 has a slot 24 in the upper end to accommodate the tip of a flat head screwdriver (not shown). As can be seen in the figure, because the grip panel bushing 20 is hollow in the center 28 the sidewall 32 of the grip panel bushing 20 is relatively thin. This makes the slot 24 susceptible to damage when high torque loads are applied to the grip panel bushing 20 for removal and installation. The present invention provides improvements to eliminate this problem, as well as to improve other shortcomings of this design.

Figure 3:
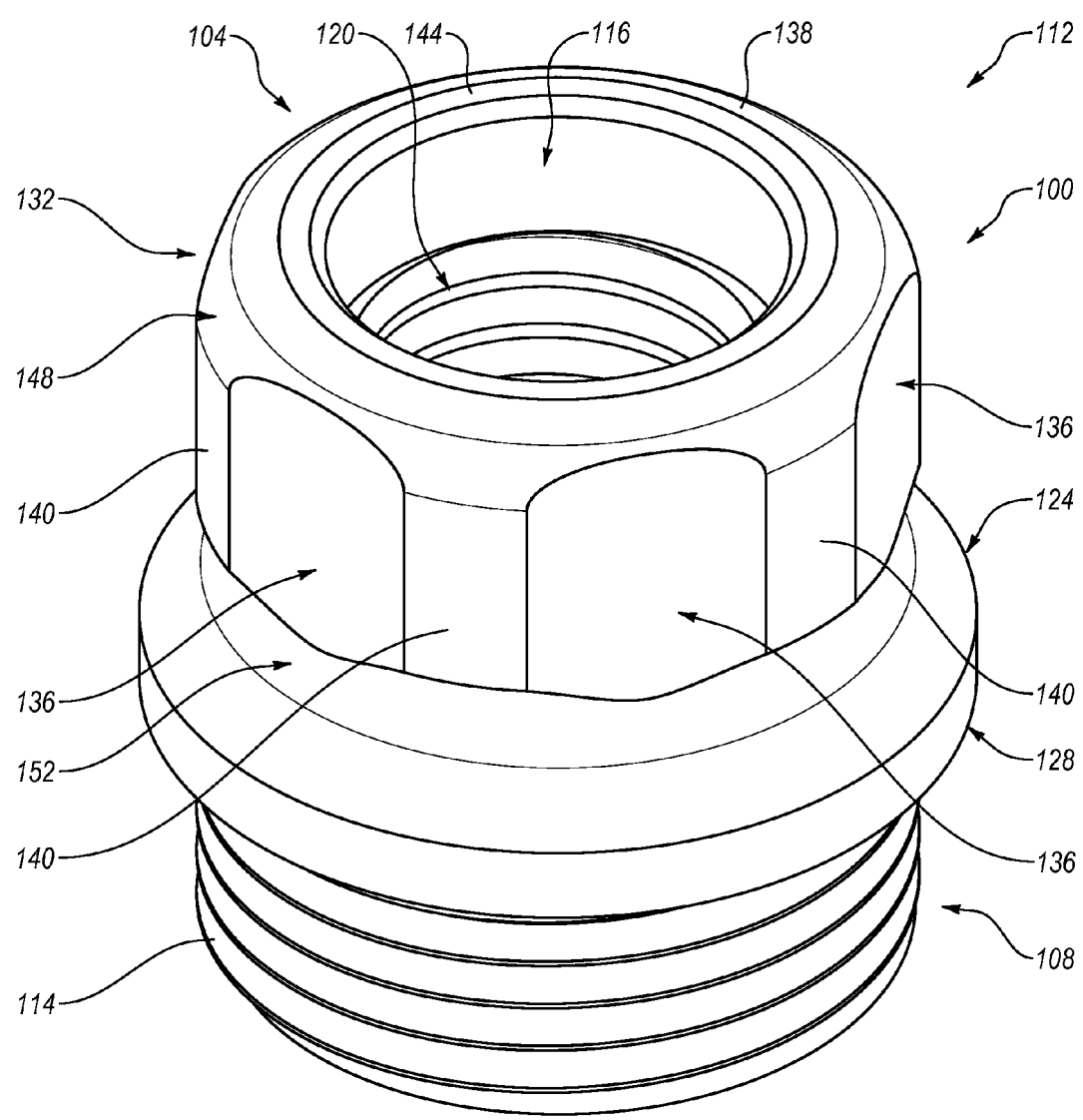
FIG. 3 is an isometric view of a grip panel bushing.

FIG. 3 is an isometric view of an embodiment of the grip panel bushing 100. The bushing 100 may be used to mount a grip panel, such as that in FIG. 1. The grip panel bushing 100 has a body 104 with a distal end 108 and a proximal end 112. An external thread 114 is located on the distal end 108 of the body. This external thread 114 is sized to threadably engage with the firearm frame (not shown). The body 104 has a hollow central portion 116. The hollow central portion 116 includes an internal thread 120 for receiving a grip screw (not shown). With this configuration, the grip panel bushing 100 attaches to the firearm frame via the external thread 114 and the grip panel is mounted to the bushing 100.

A central flange 124 is located between the distal 108 and proximal 112 ends. The diameter of the central flange 124 is larger than the diameter of the external thread 114. The diameter of the central flange 124 may also be larger than the diameter of the proximal end 112. The central flange 124 serves to axially align the grip panel bushing 100 with the firearm frame when the bottom surface 128 of the central flange 124 abuts the firearm frame.

A torquing surface 132 is located about the circumference of the proximal end 112 of the grip panel bushing 100. In the embodiment shown, the torquing surface 132 is located on the exterior of the grip panel bushing 100. This torquing surface 132 has a plurality of torquing flats 136 positioned about the exterior of the proximal end 112 of the grip panel bushing 100. The torquing flats 136 allow engagement of a tool providing torque uniformly around the perimeter of the proximal end 112 of the grip panel bushing 100. By applying a uniform torque around the exterior or interior of the grip panel bushing 100, a large amount of force can be applied to the bushing to either attach or remove it from the firearm frame. Also, the axial alignment of the bushing 100 to the threaded hole in the frame (not shown) may be more accurately controlled when the installation tool uniformly engages torquing surface 132 fully around or within the proximal end 112 of the body.

The torquing flats 136 distributed about the exterior of the proximal end 112 have a significantly larger surface area than does the slots 24 in the sidewall 32 of the prior art bushing of FIG. 2. This larger surface area allows the force required to both attach and remove the bushing 100 from the firearm frame to be evenly distributed about the proximal end 112. By distributing the force over a larger area, the potential for stripping or damaging the bushing is virtually eliminated. Moreover, because the sidewall 138 in the present design is unbroken, the bushing 100 has a high hoop strength resulting in a stronger bushing 100. By contrast, the prior art design of FIG. 2 is prone to shear failure at the slot 24 where to force applied by a flat head screwdriver will shear off the end wall of the slot 24.

The larger surface area will also allow more torque to be applied to the bushing 100 during installation or removal. Additionally, the use of torquing flats 136 as shown in FIG. 3 is advantageous because it only minimally reduces the thickness of the sidewall 140 of the grip panel bushing 100 and it does not require a break in the sidewall 138 of the body 104. This improves the overall strength of the bushing 100 and maintains the structural integrity of the bushing 100 while also providing a torquing surface distributed drive feature with enhanced torquing characteristics.

The torquing flats 136 may be separated by rounded surfaces 140. The shape of these rounded surfaces 140 is selected to minimize stress risers at the point of contact with the grip panel. A sharp edge abutting against a grip panel can begin to create cracks after repeated concussions caused by the discharge of a firearm. The large curvature of the rounded surfaces 140 distributes any contact force with the grip panel over a larger area, thus minimizing the stress risers to the grip panel. The rounded surfaces 140 also define the largest diameter of the proximal end 112 of the bushing 100 onto which the grip panel will mount via a hole in the panel. Thus, the outer diameter of the bushing 100 and its fit with the grip panel is established by the rounded surfaces 140.

The proximal end 112 of the body 104 may have varying heights to accommodate different sizes of grip panels. For thicker grip panels, the proximal end 112 will be taller and likewise for thinner grip panels, the proximal end 112 will be shorter. The grip panel bushing 100 may be made of a metallic material, such as steel or brass. Where the proximal end 112 of the body 104 is comparatively short, a strong metal, such as steel alloys, can be used to accommodate the relatively shorter height of the torquing surface 132 of the bushing 100. The bushing 100 may further be coated with myriad of materials, including nickel or zinc.

The upper internal portion 144 of the proximal end 112 of the bushing 100 may also have a counter-bore, chamfer, or rounded edge. The upper internal portion 144 is so shaped in order to allow a grip screw to easily enter and align with the inner thread 120 of the bushing 100 and to provide clearance for incomplete threads on the grip panel screws 204 on the underside of the head. The upper external portion 148 of the proximal end 112 of the bushing 100 may likewise include a rounded and/or chamfered edge. This shape accommodates the grip panel sliding over the bushing 100 more easily when assembled and also provides proper flow of the deformation of an O-ring. The grip panel bushing 100 may further include an O-ring groove 152 for receiving and holding an O-ring (not shown).

Figure 4A:
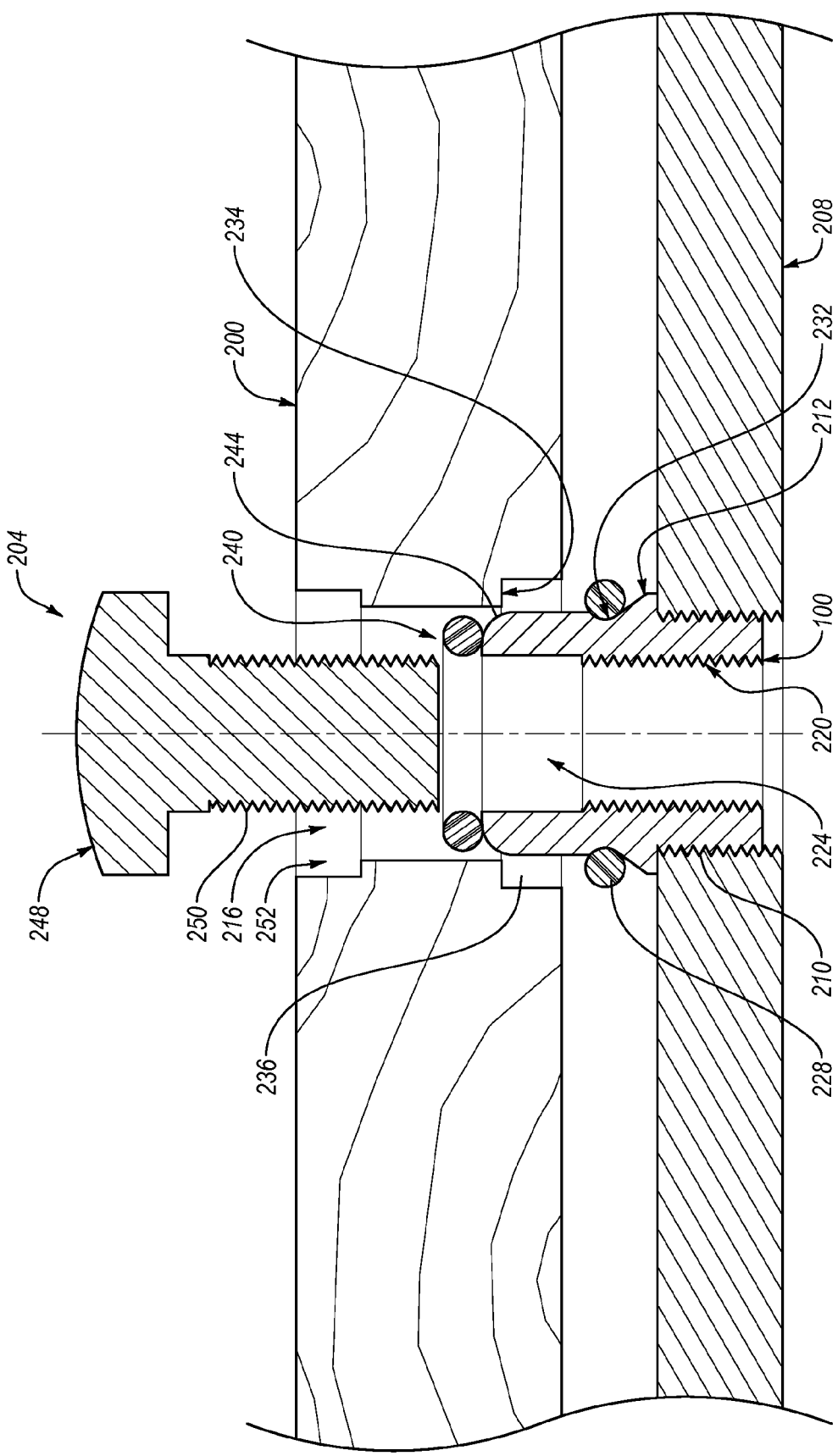
FIG. 4A is a partially exploded assembly view of a cross-section of a firearm frame, a grip panel bushing, a grip panel, a bushing O-ring, grip screw, and a grip screw O-ring.

FIG. 4A is a partially exploded assembly view of a grip panel bushing 100, a grip panel 200, a grip screw 204, and a firearm frame 208. The grip panel bushing 100 is threaded into the firearm frame 208 via a lower threaded portion 210 on the exterior of the bushing 100. The grip panel bushing 100 may be driven into the firearm frame 208 until the shaped flange 212 abuts the top surface of the firearm frame 208. Once the bushing 100 is connected to the firearm frame 208, the grip panel 200 may be slid over the bushing 100 via a hole 216 in the grip panel 200. After the grip panel 200 is mounted on top of the grip panel bushing 100, the grip screw 204 is threaded into the internal thread 220 located within the cavity 224 of the body of the bushing 100.

An O-ring 228 may be located in the O-ring groove 232. The O-ring 232 may be made of a flexible elastomeric material in order to secure and cushion components separated by the O-ring 232. The O-ring groove 232 may be a notch, channel, or rounded surface which accommodates the retention of an O-ring. The O-ring groove 232 may further be a flat surface on the bushing 100 sized to seat the O-ring 228. The O-ring 228 sits adjacent to the shaped flange 212. The shaped flange 212 may be any number of shapes, including frustoconical, tapered, rounded, or other shapes. The shaped flanged 212 may have a diameter that is larger than the O-ring groove 232. There may also be a smooth geometric transition between the O-ring groove 232 and the shaped flanged 212. The shaped flange 212 functions to spread the O-ring 228 radially outward from the bushing 100 as the grip panel 200 is driven down by the grip screw 204 toward the firearm frame 208. A shoulder 234 of the counter-bore 236 in the grip panel 200 drives the O-ring 228 down around the shaped flanged 212. The ramping shape of the flange 212 deforms the O-ring 228 laterally into the counter-bore 236 and centers the grip panel 200 around the bushing 100 via the O-ring 228, thus retaining concentricity between the bushing 100 and the grip panel 200. The interposition of the O-ring 228 between the grip panel 200 and the grip panel bushing 100 prevent direct contact between the two components.

The interposition of the O-ring 228 between the grip panel 200 and the bushing 100 during discharge of the firearm minimizes shock to the grip panels 200 and improves rigidity of the firearm grip. When a gun is discharged, the recoiling of the frame 200 and attached bushing 100 are forced backward with considerable force. This sudden motion of the frame 200 and bushing 100, and the inertia of the grip panels 200 and the hand grasping them, creates strong and sudden lateral forces between the bushings 100 and the grip panels 200. When no O-rings are present between the bushing 100 and the grip panel 200, the lateral forces created during discharge can cause the bushings 100 to suddenly impact the grip panels 200, which when repeatedly subjected to impact can create fractures radiating from the bushings 100, destroying the grip panels 200 and loosening of screws. This problem is most likely to occur with very expensive grip panels made of ivory, mammoth tooth, stone and other brittle materials.

The assembly shown in FIG. 4A may also include a second O-ring 240 that mates around the grip screw 204. The O-ring 240 aligns against a rounded, tapered, or shaped upper surface 244 of the proximal end 112 of the bushing 100. As the grip screw 204 is threaded into the internal thread 220 located in the cavity 224 of the bushing 100, the head 248 of the grip screw 204 compresses the O-ring 240. As the O-ring 240 is compressed against the rounded, tapered, or shaped outer surface 244 of the bushing 100 the O-ring deforms laterally outward and into the sides of the hole 216 of the grip panel 200. In embodiments similar to that of FIG. 3, the O-ring 240 can deform and flow around the torquing flats 136 further securing the bushing 100 relative to grip panel 208. As the O-ring deforms it centers the hole 216 in the grip panel 200 to the grip screw 204 and grip panel bushing 100. The deformed O-ring 240 also cushions the grip panel 200 from the grip screw 204.

The combination of the bushing O-ring 232 and the grip screw O-ring 240 solves a key problem associated with the prior art bushings. In the absence of the O-rings, the relative lateral motion between the bushing 100 and the grip panel 200 will cause the grip screw 204, which bear upon the grip panel 200, to pivot about the threads 250 when it is engaged with the corresponding bushing 100. As the grip screw 204 pivots, the friction between the bushing threads 220 and the grip screw threads 250 is momentarily broken, causing the grip screw 204 to loosen under the angular load applied at the engaged threads. By providing the bushing O-ring 232 and the grip screw O-ring 240, the grip panel 200 remains centered on and cushioned from the bushing 100 and the grip screw 204. Thus, the sudden percussive lateral force on the grip panel 200 caused by discharging the firearm will not pivot the grip screw 204, greatly reducing the tendency of the grip screw 204 to loosen at its engagement with the bushing 100.

The presence of both O-rings 228, 240 provide significant additional rigidity and stiffness to the grip panel 200 over prior designs. The compressed O-rings 228, 240 eliminate the gaps to allow for tolerances that must exist between the grip panel 200 and the bushing 100. Thus, there is negligible movement between the grip panel 200 and the bushing 100 when the firearm discharges.

In order to accommodate both a proximal O-ring 240 and a distal O-ring 228, the proximal O-ring 240 may have a smaller diameter than the distal O-ring 228. Thus, the grip panel can easily slide over the bushing 100 without having to force the grip panel 200 over O-ring. Additionally, corresponding to the respective diameters of the distal O-ring 228 and the proximal O-ring 240, the shaped surface of the central flange 212 may have a larger diameter than the shaped surface 244 of the proximal end 112 of the bushing 100.

Figure 4B:
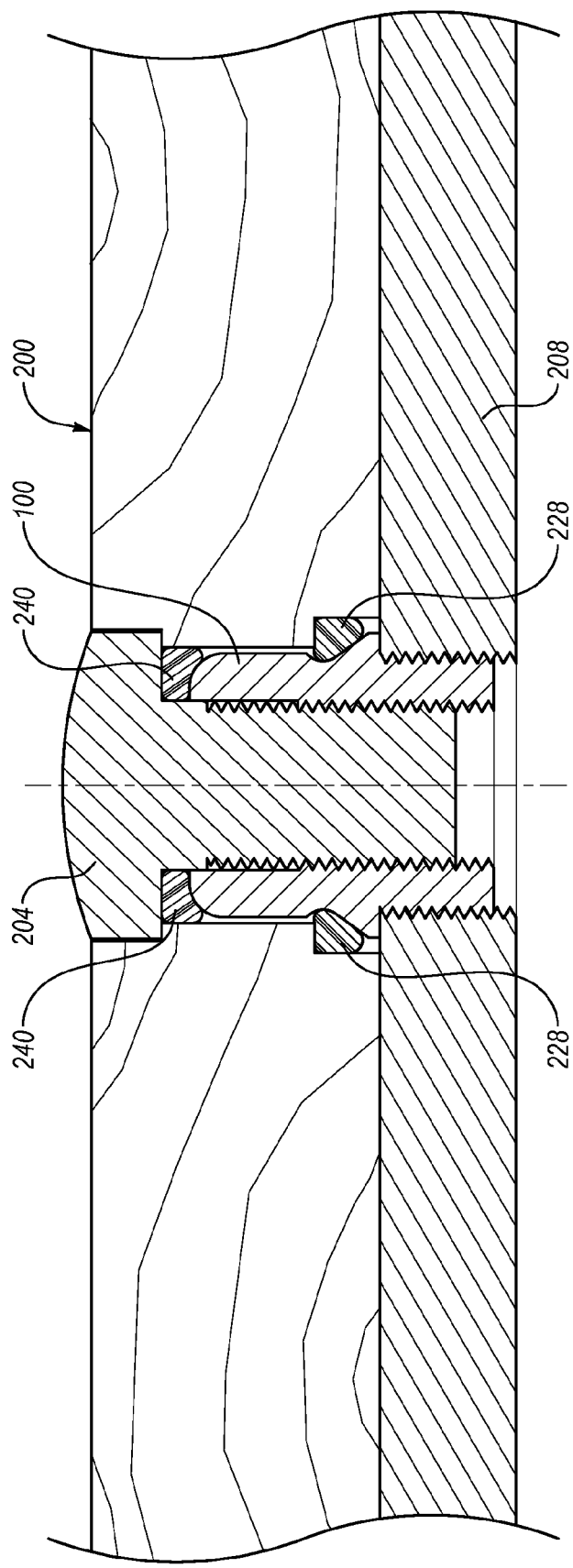
FIG. 4B is an assembled view of a cross-section of a firearm frame, a grip panel bushing, a grip panel, a bushing O-ring, grip screw, and a grip screw O-ring.

Referring now to FIG. 4B, this figure illustrates a fully assembled view of FIG. 4A. As can be seen in the figure, with the bushing 100 threaded into the frame 208 and the grip screw 204 forcing the grip panel 200 into contact with the firearm frame 208. The attachment of the grip screw 204 also causes the O-rings 228, 240 to deform which substantially eliminates relative motion between the grip panel 200 and the bushing 100. Thus, by reducing the lateral motion of the grip panel 200 relative to the bushing 100 and by forcing the O-ring 240 between the grip screw 204 and the grip panel 200, the grip screw 204 will stay engaged with the bushings 100 resulting in a more robust and firm grip panel 200 engagement.

Figure 5C:
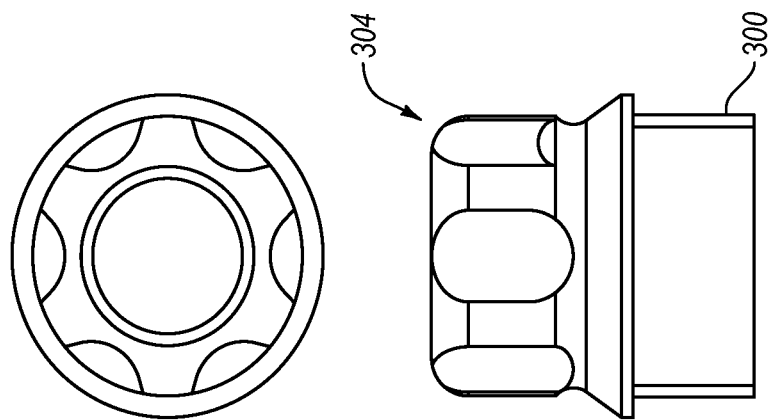
FIGS. 5A, 5B, and 5C are profile and top views of grip panel bushings according to illustrative embodiments of the invention.
Figure 5B:
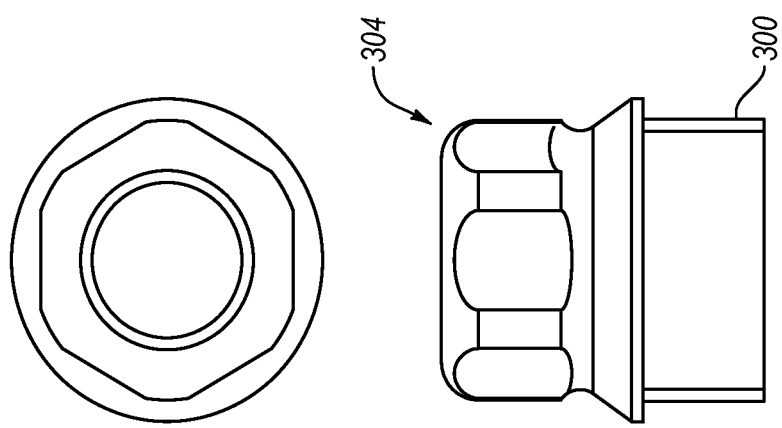
Figure 5A:
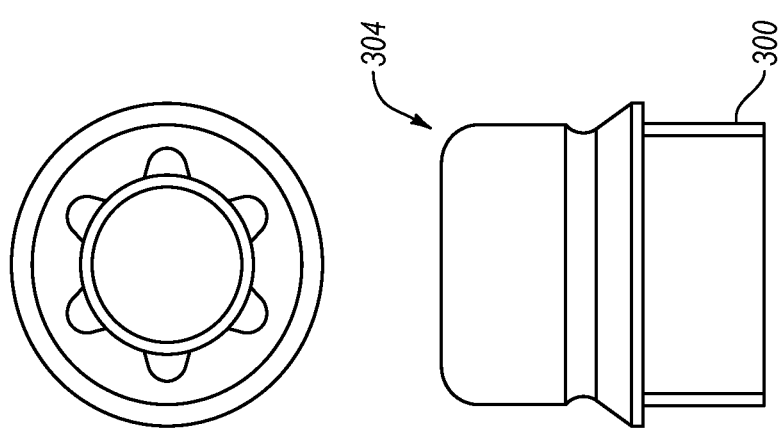

Turning to FIG. 5, several embodiments of distributed driving features or torquing surfaces are shown. The distributed drive features are located on the circumference of the upper or proximal end of the body of the grip panel bushing 300. The feature may be located on an outer surface of the circumference or an inner surface of the circumference. Locating the torquing surface on a circumference allows for the uniform application of force to the bushing 300. Different types of distributed driving features or torquing surfaces can be used, such as an internal or external hexalobular or star drive shape (FIG. 5A), an external polygonal (hexagonal) drive shape (FIG. 5B), an external hexalobular drive shape (FIG. 5C), a spline shaped drive, an internal double square drive shape, or an internal polydrive drive shape. Of course, other shapes may be possible that provide uniform torque about the circumference of the head or proximal end 304 of the bushing 300.

The distributed torquing surface, such as those shown in FIGS. 5A-C, provide a better grip around the proximal end 304 of the bushing allowing for increased torque for installation and removal of the bushings 300. Furthermore, the distributed driving/torquing features allow for improved holding of the bushing 300 by the tool (not shown) during installation, yielding better alignment and decreasing the risk of cross threading. These types of torquing surfaces do not suffer from the problems of the prior art shown in FIG. 2 which allow both radial and axial slippage between the screwdriver and the mating slot of the bushing and where the sidewall 32 can be damaged or stripped by applying all the torque on to two small points on this wall. Thus the present invention provides increased torque and robustness to the bushing and resolves a problem that has existed in these bushings since inception more than 100 years ago.

Figure 6C:
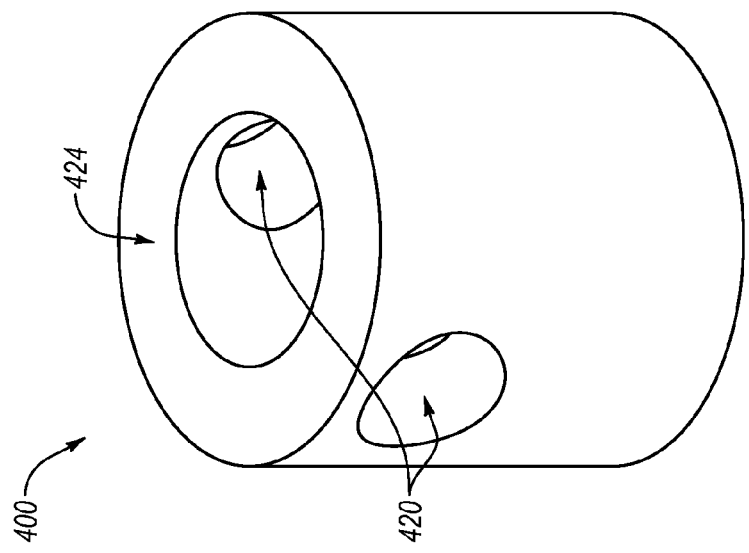
FIGS. 6A, 6B, and 6C are perspective and profile views, respectively, of a bushing torquing tool head.
Figure 6B:
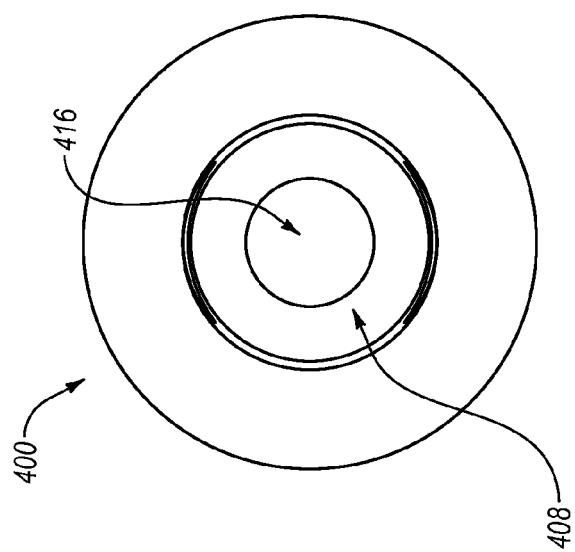
Figure 6A:
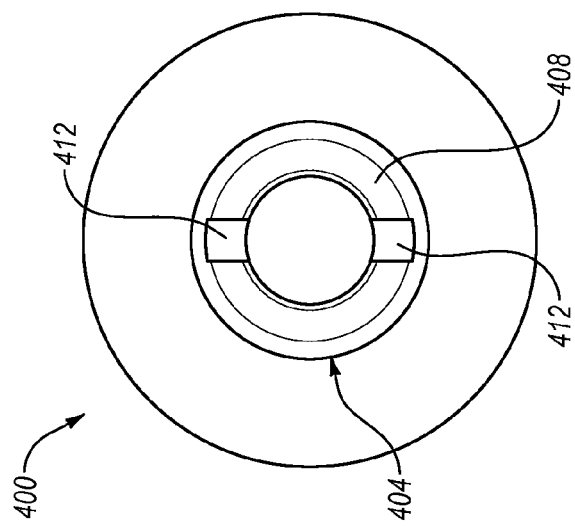

As the grip panel bushing shown in FIG. 3 may function as a replacement for an OEM prior bushing, there is a need to provide a tool that can effectively remove the bushings of the type shown in FIG. 2. FIG. 6 shows such a tool for removing the existing bushings having the single slot type head. The tool comprises a cup 400 having a central opening 404 for fitting around the head of a bushing. The central opening 404 may be restricted by a shoulder section 408. The shoulder section 408 may have a smaller diameter than the head of the bushing being removed, such that the bushing may not slip through the center of the cup 400. The shoulder section 408 may include protuberances 412 for mating with a bushing having a standard slot-type torquing feature, such as shown in FIG. 2. Alternatively, the internal shape of the tool closely matches the external shape of the bushing to be removed, thus preventing the tool from sheering off the head of the bushing being removed.

When the cup 400 is fitted over the head of the OEM bushing, the protuberances 412 insert into the standard slot-type torquing features of the bushing to be removed. Once the protuberances 412 are mated into the slot, a screw, similar or identical to the grip screw described previously, may be inserted through the open back end 416 (located on the opposite side of the protuberances) and threaded into the bushing to be removed. By attaching a screw (not shown) whose head seats against the shoulder section 408 opposite the bushing, the engagement between the protuberances 412 and the slots of the bushing head cannot be separated. The screw also provides a significant amount of frictional force between the shoulder section 408 and the bushing to be removed. Thus the slippage between the tool and the bushing will be eliminated.

Once the tool is secured to the bushing, a torquing arm or other torquing attachment may be applied to the cup 400. FIG. 6C shows an arm mount 420 in which a torquing arm, such as a bar, or screwdriver may be inserted and then rotated to break or loosen a tightly fastened bushing. In an alternative embodiment, the top edge 424 of the cup 400 may include an internal or external shape capable of receiving a tool such as a standard screw driver, an internal hexalobular drive shape, external hexagonal drive shapes, spline drive shapes, internal double square drive shapes, an internal polydrive drive shapes, or any of the drive designs previously shown herein or an integral axial extension to act as a handle for the rotating tool. In another embodiment, the torquing arm or attachment can be integrally formed with the cup 400.

In another embodiment of the invention, the various components described above may be included in a kit that allows the owner to remove prior OEM bushings and replace them with the bushings described herein. One kit may include a first torquing tool for removing the OEM bushing, such as the bushing shown in FIG. 2. The first torquing tool may be the tool shown in FIG. 6. The kit may also include two or more of the bushings shown in FIG. 3-5 or set forth in the description. As each side of the grip panel requires two bushings to attach it to the frame, the kit may include two or four bushings. Likewise, the kit may include two or four grip screws in order to secure the grip panel to the bushings. The kit may further include a bushing O-ring for each bushing and a grip screw O-ring for each grip screw. The kit may additionally include a second torquing tool selected to mate with and drive the bushing shown in FIG. 3-5. The kit may also include a driver for fastening the grip screw. Thus, the user may receive all tooling required to remove the old bushings and install the new bushings without being required to provide any of his own tooling. The kit may include two or more grip panels to be installed in the firearm frame. The kit may further include a tap for cleaning out the threads of the firearm frame, which may be required when Loctite is used by an OEM on the threads.

In view of the preceding, a kit may include two grip panel bushings, a tool for installing these bushings, a different tool for removing the OEM bushings, and two grip screws. Another variation of the kit may further include O-rings for both the bushing and the grip screws along with one or more grip panels. In another variation the kit may include four grip panel bushings, four grip screws, four bushing O-rings, four grip screw O-rings, a tool like that shown in FIG. 6 for removing the bushing shown in FIG. 2, a tool for installing the bushings of FIG. 3 or FIG. 5, and a tool for installing the grip screws.

It should be understood that various aspects and embodiments of the invention can be combined in various ways. Based on the teachings of this specification, a person of ordinary skill in the art can readily determine how to combine these various embodiments. Modifications may also occur to those skilled in the art upon reading the specification.

What is claimed is:

1. An interchangeable handgun grip panel bushing and a handgun comprising a handgun frame, the bushing configured to mount a grip panel to the handgun frame, the bushing comprising:
   a body having a proximal end, a distal end, and a hollow central portion;
   an external thread on the distal end of the body configured to couple to the handgun frame;
   an internal thread located on the hollow central portion of the body configured to receive a grip screw for securing a grip panel to the handgun frame;
   a central flange located between the proximal end and the distal end, the central flange having an alignment surface to align the bushing to the handgun frame; and
   a plurality of driving features distributed about an internal or external circumference of the proximal end of the body defining a torqueing surface, wherein an uppermost surface of the proximal end comprises a continuous and unbroken circumference along a plane perpendicular to a longitudinal axis of the bushing.

2. The bushing of claim 1, further wherein the central flange is frustoconically shaped.

3. The bushing of claim 1, further comprising a bushing O-ring positioned between the central flange and the proximal end.

4. The bushing of claim 1, further comprising a bushing O-ring groove positioned in an exterior of a side wall between the central flange and the proximal end, and having a bushing O-ring located within the bushing O-ring groove.

5. The bushing of claim 4, wherein, when the bushing is mated with a grip panel, the central flange is shaped to laterally deform the bushing O-ring.

6. The bushing of claim 1, further comprising a grip screw that mates with the internal thread of the bushing, the grip screw having a grip screw O-ring located on the grip screw.

7. The bushing of claim 1, wherein the torquing surface is one of the following shapes: hexagonal, hexalobular, splinal, double square, or polydrive.

8. The bushing of claim 1, wherein the torquing surface has a plurality of flats about the circumference of the proximal end of the body.

9. The bushing of claim 8, further comprising rounded surfaces located between the torquing flats.

10. A serviceable handgun bushing and a handgun comprising a frame, the bushing configured to mount a grip panel to the handgun frame, the bushing comprising:
    a bushing body;
    a lower thread portion on an exterior of the body configured to couple to the handgun frame;
    an internal thread located in a cavity of the body configured to receive a grip screw for securing a grip panel to the handgun frame;
    a distributed driving feature on an end of the body opposite the lower thread portion comprising one of:
    an external polygonal drive shape,
    an external hexagonal drive shape,
    an external hexalobular drive shape,
    an internal hexalobular drive shape,
    an internal spline drive shape,
    an internal double square drive shape, or
    an internal polydrive drive shape; and
    a shaped flange located between the distributed drive feature and the lower thread portion.

11. The bushing of claim 10, further comprising a bushing O-ring groove positioned between the flange and the distributed driving feature.

12. The bushing of claim 11, further comprising a bushing O-ring located within the bushing O-ring groove.

13. The bushing of claim 12, wherein the shaped flange is frustoconically shaped and configured to deform the bushing O-ring into a counter-bore of a grip panel when secured to the handgun frame.

14. The bushing of claim 10, further comprising a grip screw that mates with the internal thread of the bushing, and an O-ring located on the grip screw.

15. An interchangeable handgun grip panel bushing and a handgun comprising a frame, the bushing configured to mount a grip panel to the handgun frame, the bushing comprising:
    a bushing body;
    a lower thread portion on an exterior of a lower end of the bushing body configured to couple to the handgun frame;
    an internal thread located in a cavity of the bushing body configured to receive a grip screw for securing a grip panel to the handgun frame;
    a torqueing surface located at an upper end of the bushing body, the torqueinq surface comprising a plurality of driving features distributed about an internal or external circumference of the upper end of the bushing body, wherein an uppermost surface of the upper end comprises a continuous and unbroken circumference along a plane perpendicular to a longitudinal axis of the bushing;
    a central flange located between the lower thread portion and the torqueing surface, the central flange having an upper surface and a bottom surface, the bottom surface configured to align the bushing to the handgun frame; and
    an O-ring located adjacent the upper surface of the central flange.

16. The bushing of claim 15, wherein the upper surface of the central flange is shaped such that the O-ring expands laterally when as it is driven toward the bottom surface of the central flange.

17. The bushing of claim 15, further comprising an O-ring groove located adjacent the upper surface of the central flange.

18. The bushing of claim 15 wherein the central flange is frustoconically shaped.

\* \* \* \* \*